(12) United States Patent
Young, Jr.

(10) Patent No.: US 6,464,380 B1
(45) Date of Patent: Oct. 15, 2002

(54) LIGHTED BLADE GUIDES FOR A SNOWPLOW

(76) Inventor: Roy R. Young, Jr., 17351 State Rte. 58, Wellington, OH (US) 44090

(*) Notice: Subject to any disclaimer, the term of this patent is extended or adjusted under 35 U.S.C. 154(b) by 0 days.

(21) Appl. No.: 09/706,200

(22) Filed: Nov. 3, 2000

Related U.S. Application Data

(60) Provisional application No. 60/163,320, filed on Nov. 3, 1999.

(51) Int. Cl.$^7$ ................................ B60Q 1/32
(52) U.S. Cl. .............. 362/485; 362/511; 362/523; 362/543; 362/390; 340/425.5
(58) Field of Search .............. 362/89, 91, 119, 362/120, 234, 249, 250, 369, 390, 473, 485, 487, 540, 543, 549, 459, 523, 511; 340/431, 425.5

(56) References Cited

U.S. PATENT DOCUMENTS

| | | | |
|---|---|---|---|
| D243,274 S | 2/1977 | Miceli | D48/32 |
| D258,917 S | 4/1981 | Urbanek et al. | D26/35 |
| 4,277,818 A | 7/1981 | Urbanek et al. | 362/549 |
| D260,937 S | 9/1981 | Hetrick | D26/35 |
| 4,628,415 A * | 12/1986 | Vescio et al. | 362/390 |
| 4,662,947 A * | 5/1987 | Hopkins | 362/120 |
| D290,515 S | 6/1987 | Brownlie | D26/35 |
| 5,379,197 A * | 1/1995 | Conyers et al. | 362/390 |
| 5,595,441 A * | 1/1997 | McGee | 362/250 |
| 6,005,300 A | 12/1999 | Kelly | 307/10.1 |
| 6,154,122 A * | 11/2000 | Menze | 362/487 |

* cited by examiner

*Primary Examiner*—Alan Cariaso
(74) *Attorney, Agent, or Firm*—Fay, Sharpe, Fagan, Minnich & McKee, LLP

(57) ABSTRACT

A blade guide adapted to be attached to a snow plow blade comprising a mounting bracket for attachment to a snow plow blade, a member extending upwardly from the mounting bracket relative to the snow plow blade, and a light source operatively attached to the member for illuminating the blade guide.

20 Claims, 2 Drawing Sheets

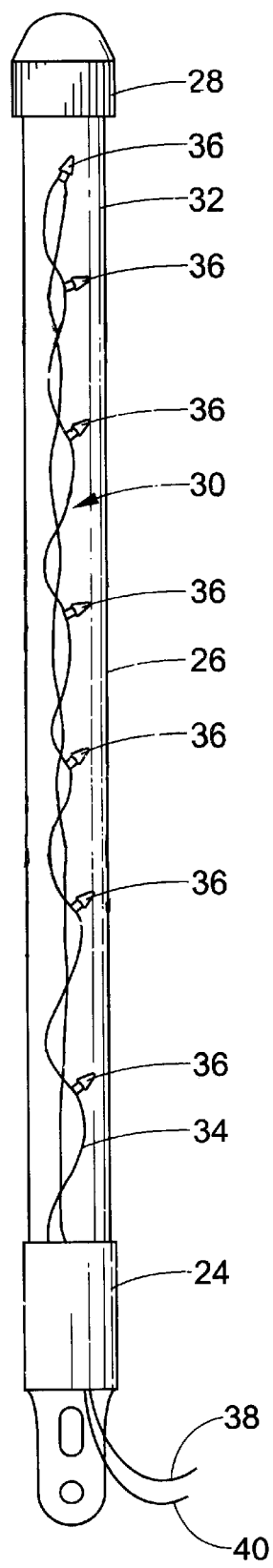
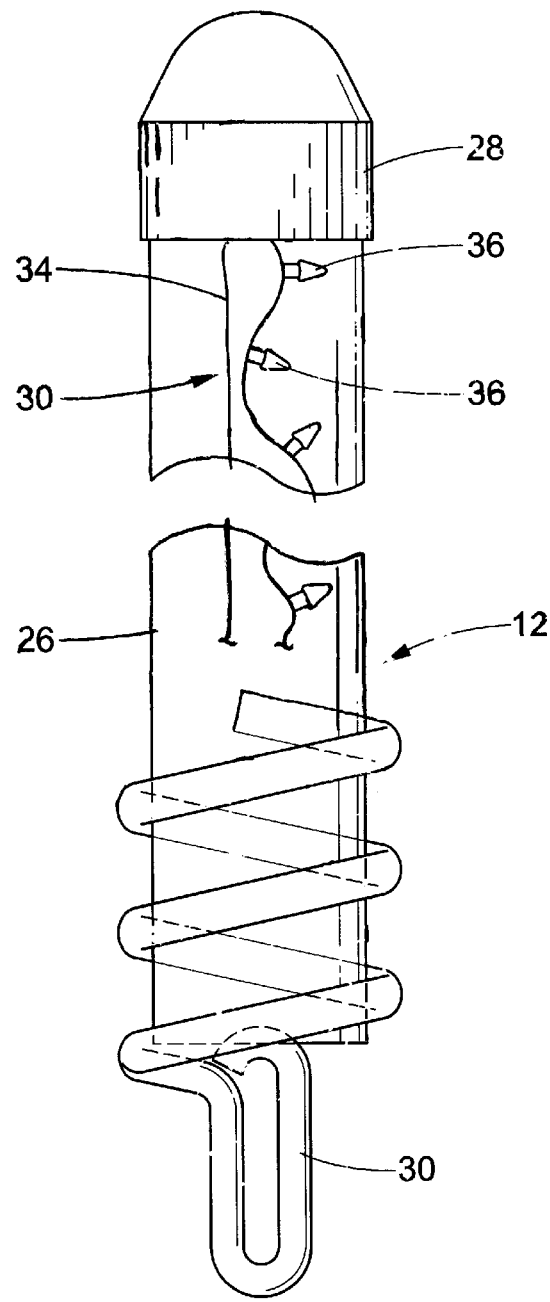
FIG. 3
FIG. 4

LIGHTED BLADE GUIDES FOR A SNOWPLOW

This application claims the benefit of and hereby expressly incorporates by reference U.S. Provisional Application Serial No. 60/163,320, filed on Nov. 3, 1999.

BACKGROUND OF THE INVENTION

1. Field of the Invention

The present invention relates to an elongated marker for delineating the shape and/or position of a snowplow that is subject to an obstructed view, and more particularly, to a new and improved blade guide. The present invention finds particular application in conjunction with a snow plow blade attached to a vehicle and is described herein with particular reference thereto. However, it is to be appreciated that the present invention is also amenable to other applications.

2. Discussion of the Art

Snow plow blades are commonly attached to the front of vehicles for the purpose of removing snow from undesirable locations. When used for plowing, the blades are generally lowered toward and positioned adjacent the surface being plowed. In the plowing position, a driver's view of the plow blade is often obstructed by the front portion of the vehicle to which the plow blade is attached. As a result, it is often difficult for the driver to determine the exact location of the opposing lateral edges of the plow blade and the angle of the plow blade relative to the axles of the supporting vehicle. Also, drivers of other vehicles, such as overtaking vehicles, are often not able to see the plow blade.

To overcome these problems, it is known to attach a pair of markers or blade guides to the snow plow blade. Such conventional blade guides are essentially posts or stakes that project upwardly from the opposing lateral sides of the snow plow blade. More specifically, each conventional blade guide is attached at or near a lateral edge of the snow plow blade to assist in delineating where the lateral sides of the blade are positioned. Further, these conventional blade guides assist the driver in determining the angle of the blade relative to the axles of the vehicle to which the blade is attached.

Nonetheless, it remains difficult for the driver of a vehicle equipped with a snow plow blade having conventional blade guides to see the blade guides necessary to determine where the opposite lateral edges of the blade are located and to determine the angle of the plow relative to the axles of the vehicle at all times. These difficulties are particularly troublesome during periods of low visibility, such as during non-daylight hours, bad weather, and the like. Further, conventional blade guides do little to assist the drivers of other vehicles to see the snow plow blade under such conditions.

The present invention provides new and improved blade guides for overcoming the above-reference drawbacks and others.

BRIEF SUMMARY OF THE INVENTION

In accordance with the present invention, a blade guide adapted to be attached to a snow plow blade is provided. The blade guide comprises a mounting bracket for attachment to a snow plow blade, a member extending upwardly from the mounting bracket relative to the snow plow blade, and a light source operatively attached to the member for illuminating the blade guide.

In accordance with a principle feature of the present invention, the bracket comprises a spring portion and a mounting portion. The spring portion provides flexibility to the blade guide relative to the plow blade.

In accordance with another feature of the present invention, the member is hollow and tubular.

In accordance with another feature of the present invention, a cap slidably engages a distal end of the tubular member thereby sealing the tubular member.

In accordance with another feature of the present invention, the light source is a lighting harness having a plurality of light bulbs positioned along it length. The lighting harness is operatively positioned within the tubular member along the length of the tubular member.

In accordance with another feature of the present invention, the light source is a lighting harness having a fiber optic element positioned within the tubular member and illuminating the length of the tubular member,.

In accordance with another feature of the present invention, the blade guide further comprises a wiring harness connected to the light source. The wiring harness is adapted to be connected to a power source of a vehicle to which the snow plow blade is capable of being attached thereto.

A main advantage of the present invention resides in the provision of improved blade guides for a snow plow blade attached to a vehicle that allows a driver of the vehicle to determine the position of the lateral sides of the snow plow blade.

Another primary advantage of the present invention is the provision of improved blade guides for a snow plow blade attached to a vehicle that allows a driver of a vehicle to determine the angle of the blade relative to the axles of the vehicle.

A further advantage of the present invention is the provision of improved blade guides for a snow plow blade attached to a vehicle that allows drivers of other vehicles to see the location of the snow plow blade.

Still other advantages and benefits of the invention will be apparent to those skilled in the art upon reading and understanding the following detailed description.

BRIEF DESCRIPTION OF THE DRAWINGS

The invention may take form in various components and arrangements of components, and in various steps and arrangements of steps. The drawings are only for purposes of illustrating the preferred embodiments and are not to be construed as limiting the invention.

FIG. 3 is an elevational plan view of a lighted blade guide adapted to be mounted to a snow plow blade in accordance with the present invention; and FIG. 4 is an elevational view of an alternate embodiment of the lighted blade guide in accordance with the present invention.

DETAILED DESCRIPTION OF THE INVENTION

Figure 1:
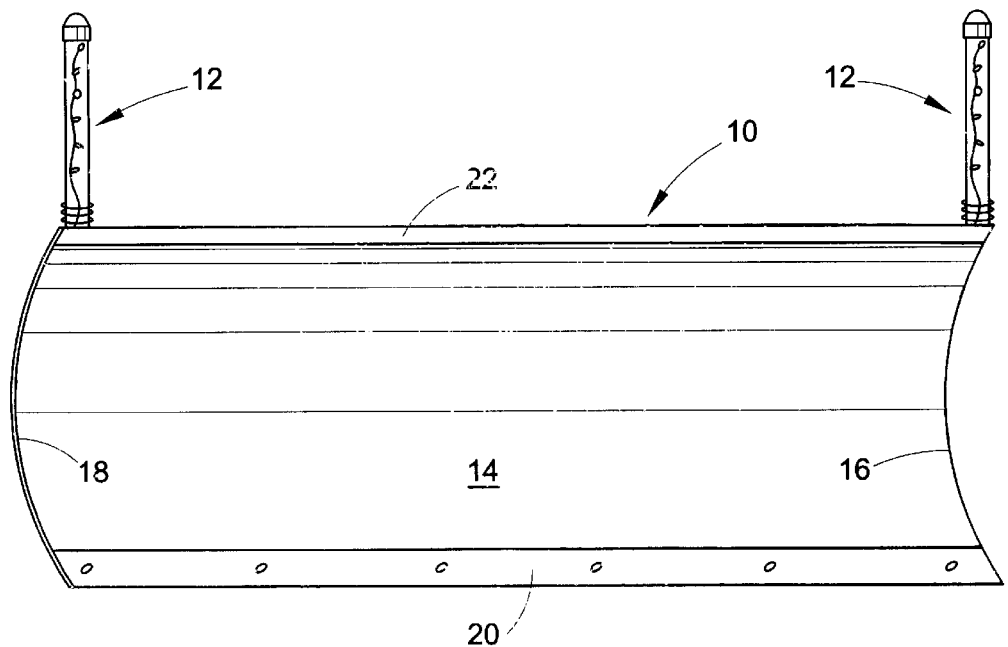
FIG. 1 is a front elevation view of a pair of lighted blade guides mounted to a snow plow blade in accordance with the present invention.

With reference to FIG. 1, a conventional snow plow blade 10 has a pair of lighted blade guides 12 attached thereto. The plow blade 10 comprises a plow face 14, opposing lateral sides 16, 18, plowing edge 20, and top side 22. The snow plow blade 10 is adapted to be attached to a vehicle (not shown) as is well known.

The lighted blade guides 12 are connected to the plow blade 10 at or near the intersection of each lateral side 16, 18 with the top side 22 of the plow blade 10. The lighted blade guides 12 project upwardly from the plow 10 a sufficient distance to be clearly visible by a driver of the vehicle at all times. Thus, the lateral sides 16, 18 of the plow blade 10 are clearly delineated to the driver of the vehicle to which the plow blade 10 is attached. From the respective positions of the lateral sides 16, 18 the driver is able to determine the angle of the plow blade 10 with respect to an axle of the vehicle. Further, the existence and position of the plow blade 10 is more readily apparent to other drivers at all times.

With additional reference to FIG. 3, each blade guide 12 includes a mounting bracket 24, a tubular member 26, an end cap 28, and a lighting harness 30. The mounting bracket 24 is used to connect the blade guide 12 to the plow blade 10. More specifically, the mounting bracket 24 is fastened to the plow blade 10 by conventional means such as through the use of screws, bolts, or other fasteners. Once mounted, each blade guide 12 is secured to the plow blade 10 in an upwardly projecting position relative to the plow blade 10 as best illustrated in FIG. 1.

The tubular or elongated hollow member 26 extends upwardly from the mounting bracket 24 relative to the plow blade 10. More specifically, the tubular member 26 slidably engages the mounting bracket 24 by fitting within the annular portion of the mounting bracket 24. The tubular member 26 is clear or transparent, thus, capable of allowing light to pass therethrough. Alternatively, the tubular member 26 may be colored and translucent but still capable of allowing light to pass therethrough.

The end cap or plug 28 is slidably secured to the open, distal end 32 of the blade guide 12. The end cap 28 seals the tubular member 26 thereby preventing water and other elements from passing into the tubular member 26 through the open, distal end 32.

The lighting harness 30 comprises an electrical circuit wire 34 and a plurality of illumination sources, such as small, low wattage light bulbs 36 operatively connected along a defined length of the wire 34. The lighting harness 30 resides within the tubular member 26 along its length such that the bulbs 36 are disposed along the length of the tubular member 26. When electricity is passed through the wire 34, the bulbs 36 are illuminated.

Figure 2:
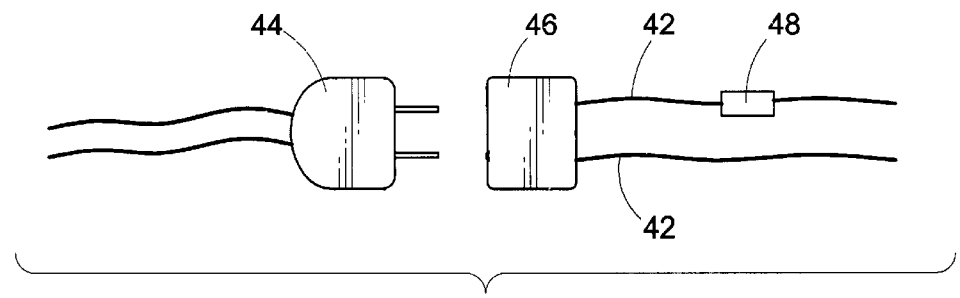
FIG. 2 is a diagrammatic view of a plug mechanism in accordance with the present invention.

The ends 38, 40 of the wire 34 pass through the mounting bracket 24 and are capable of connecting to vehicle auxiliary wires 42. More specifically, with reference to FIG. 2, the ends 38, 40 connect to a plug mechanism 44 through conventional means. The plug mechanism 44 removably connects to a plug receptor 46 of the vehicle. Thus, the vehicle auxiliary wires 42 are operatively connected to each lighted blade guide 12 and deliver electrical power to the light bulbs 36 of the blade guides 12. The plug receptor 46 connects to a power source of the vehicle such as the parking lights as is well known.

Alternatively, the power source may be any other light circuit of the vehicle or any other component of the electrical system of the vehicle. An electrical switch 48, such as a toggle switch, is preferably positioned in the associated vehicle and operable by a driver to control the flow of electrical current to the lighted blade guides 12 through the wires 42.

Alternatively, other light source arrangements may be employed. For example, a fiber optic element could be used to transmit light along the length of the tubular member 26.

In another alternative, a single light source can be located in the bracket 26 or at the base or upper end of the tubular member 26 so that it projects light into and/or along the length of the member 26. In such an arrangement, the member 26 could be solid, defined from acrylic or the like. Of course, a single bulb or the like could be positioned at any point along the length of the member 26. For example, the member 26 could be a steel rod with a single light bulb located at its distal end 30.

In an alternate embodiment, with reference to FIG. 4, the mounting bracket 24 is replaced by a spring bracket 50. The spring bracket 50 is adapted to be attached to the plow blade 10 in the same manner as the mounting bracket 24. Additionally, the spring bracket 50 allows the blade guide 12 to flexibly move relative to the plow blade 10 while remaining bias toward an upward projecting position. Such an arrangement may prolong the usable life of the blade guides 12.

The invention has been described with reference to the preferred embodiments. Obviously, modifications and alterations will occur to others upon reading and understanding the preceding detailed description. It is intended that the invention be construed as including all such modifications and alterations insofar as they are within the scope of the appended claims or the equivalents thereof.

Having thus described the preferred embodiments, the invention is now claimed to be:

1. A blade guide adapted to be attached to a snow plow blade, the blade guide comprising:
   a mounting bracket for attachment to a snow plow blade;
   a guide member extending upwardly from the mounting bracket relative to the snow plow blade for indicating the location of a lateral side of the snow plow blade; and
   a light source operatively attached to the guide member for illuminating the guide member.

2. The blade guide as set forth in claim 1 wherein the bracket comprises a spring portion and a mounting portion; the spring portion providing flexibility to the blade guide relative to the plow blade.

3. The blade guide as set forth in claim 1 wherein the member is hollow and tubular.

4. The blade guide as set forth in claim 3 wherein a cap slidably engages a distal end of the tubular member thereby sealing the tubular member.

5. The blade guide as set forth in claim 3 wherein the light source is a lighting harness having a plurality of light bulbs positioned along its length; the lighting harness operatively positioned within the tubular member along the length of the tubular member.

6. The blade guide as set forth in claim 3 wherein the light source is a lighting harness having a fiber optic element positioned within the tubular member and illuminating the length of the tubular member.

7. The blade guide as set forth in claim 1 wherein the blade guide further comprises:
   a wiring harness connected to the light source, the wiring harness adapted to be connected to a power source of a vehicle to which the snow plow blade is capable of being attached thereto.

8. A blade guide for a snow removal blade, the blade guide comprising:
   a first end adapted for fixed securement to an associated snow removal blade adjacent a lateral edge of the associated snow plow blade;
   a second end spaced axially from the first end;

a central portion located between the first end and the second end; and a light source located between the first and second ends for illuminating at least the central portion of the blade guide.

9. A snow removal blade comprising:

a blade; and first and second lighted blade guides on opposite lateral sides of the blade, each of the lighted blade guides comprising:
a bracket for attachment to the blade;
a member extending upwardly from the bracket relative to the snow plow blade; and
a light source operatively attached to the member for illuminating the blade guide.

10. The blade guide as set forth in claim 8 further comprising a spring-stiffened mounting bracket for connecting the blade guide to the associated snow removal blade and providing flexibility to the blade guide relative to the associated snow removal blade.

11. The blade guide as set forth in claim 8 wherein the guide member is tubular.

12. The blade guide as set forth in claim 11 wherein a cap slidably engages a distal end of the tubular guide member thereby sealing the tubular guide member.

13. The blade guide as set forth in claim 11 wherein the light source is a lighting harness having a plurality of light bulbs positioned along the length of the tubular member;
the lighting harness operatively positioned within the tubular member along the length of the tubular member.

14. The blade guide as set forth in claim 11 wherein the light source is a lighting harness having a fiber optic element positioned within the tubular member and illuminating the length of the tubular member.

15. The blade guide as set forth in claim 8 wherein the blade guide further comprises:

a wiring harness connected to the light source, the wiring harness adapted to be connected to a power source of a vehicle to which the snow plow blade is capable of being attached thereto.

16. The blade guide as set forth in claim 9 wherein the bracket comprises a spring portion and a mounting portion, the spring portion providing flexibility to the blade guide relative to the plow blade.

17. The blade guide as set forth in claim 9 wherein the member is hollow and tubular.

18. The blade guide as set forth in claim 17 wherein a cap slidably engages a distal end of the tubular member thereby sealing the tubular member.

19. The blade guide as set forth in claim 17 wherein the light source is a lighting harness having a plurality of light bulbs positioned along the length of the tubular member.

20. The blade guide as set forth in claim 17 wherein the light source is a lighting harness having a fiber optic element positioned within the tubular member and illuminating the length of the tubular member.

* * * * *